(12) United States Patent
Anderson

(10) Patent No.: US 6,996,917 B2
(45) Date of Patent: Feb. 14, 2006

(54) TWO STAGE APPARATUS FOR DESOLVENTIZING FOOD GRAIN MEAL

(75) Inventor: George E. Anderson, Champlin, MN (US)

(73) Assignee: Crown Iron Works Company, Roseville, MN (US)

( * ) Notice: Subject to any disclaimer, the term of this patent is extended or adjusted under 35 U.S.C. 154(b) by 658 days.

(21) Appl. No.: 10/251,068

(22) Filed: Sep. 20, 2002

(65) Prior Publication Data

US 2003/0072867 A1   Apr. 17, 2003

Related U.S. Application Data

(60) Provisional application No. 60/329,790, filed on Oct. 15, 2001.

(51) Int. Cl.
   *F26B 25/06* (2006.01)
(52) U.S. Cl. ............... 34/209; 34/73; 34/86; 34/92; 34/165; 34/218
(58) Field of Classification Search ............... 34/72, 34/73, 86, 92, 370, 380, 407, 467, 468, 165, 34/201, 209, 218; 426/487, 489; 554/12, 554/20

See application file for complete search history.

(56) References Cited

U.S. PATENT DOCUMENTS

| | | | |
|---|---|---|---|
| 2,618,560 A * | 11/1952 | Hendrich | 554/12 |
| 3,367,034 A | 2/1968 | Good | 34/10 |
| 3,392,455 A | 7/1968 | Kingsbaker Jr. et al. | 34/36 |
| 3,742,001 A | 6/1973 | Levin | 260/412.8 |
| 3,878,232 A | 4/1975 | Hayes et al. | 260/412.4 |
| 3,970,764 A | 7/1976 | Karnofsky | 426/430 |
| 4,503,627 A | 3/1985 | Schumacher | 34/173 |
| 4,619,053 A | 10/1986 | Schumacher | 34/12 |
| 4,622,760 A | 11/1986 | Schumacher | 34/65 |
| 4,794,011 A * | 12/1988 | Schumacher | 426/489 |
| 5,041,245 A | 8/1991 | Benado | 260/412.1 |
| 5,630,911 A * | 5/1997 | Kratochwill | 196/14.52 |
| 5,783,243 A | 7/1998 | Benado | 426/425 |
| 5,992,050 A | 11/1999 | Kemper et al. | 34/588 |
| 6,066,350 A | 5/2000 | Purtle et al. | 426/430 |
| 6,361,814 B2 | 3/2002 | Purtle et al. | 426/430 |
| 6,732,454 B2 * | 5/2004 | Anderson et al. | 34/218 |

OTHER PUBLICATIONS

Beckel, A.C. and T.H. Hopper. *Heat Denaturation of Protein in Soybean Meal*. Industrial and Engineering Chemistry. vol. 34, No. 8. Aug. 1942.

\* cited by examiner

*Primary Examiner*—Jiping Lu
(74) *Attorney, Agent, or Firm*—Nawrocki, Rooney & Sivertson, P.A.

(57) ABSTRACT

A desolventizing system for removing solvent from a quantity of solvent-laden particles such as flakes comprises first and second desolventizer units, each having an inlet port for receiving solvent-laden particles, an outlet port for discharging at least partially desolventized particles, and a solvent vapor port. A solvent trap is connected between the outlet port of the first desolventizer through a first airlock, and to the inlet port of the second desolventizer unit. Particles entering the solvent trap through the first airlock are conveyed to the inlet port of the second desolventizer. The second desolventizer unit has an airlock connected to the outlet port of the second desolventizer unit. The solvent trap has a vent preferably in the upper part of the trap for connection to a vacuum source that maintains a partial vacuum within both the solvent trap and the second desolventizer unit allowing liquid solvent and water permeating particles within the second desolventizer unit to vaporize efficiently at a relatively low temperature. Solvent vaporized in each desolventizer unit can be drawn out through the solvent vapor port of the desolventizer unit for further processing and later reuse.

11 Claims, 1 Drawing Sheet

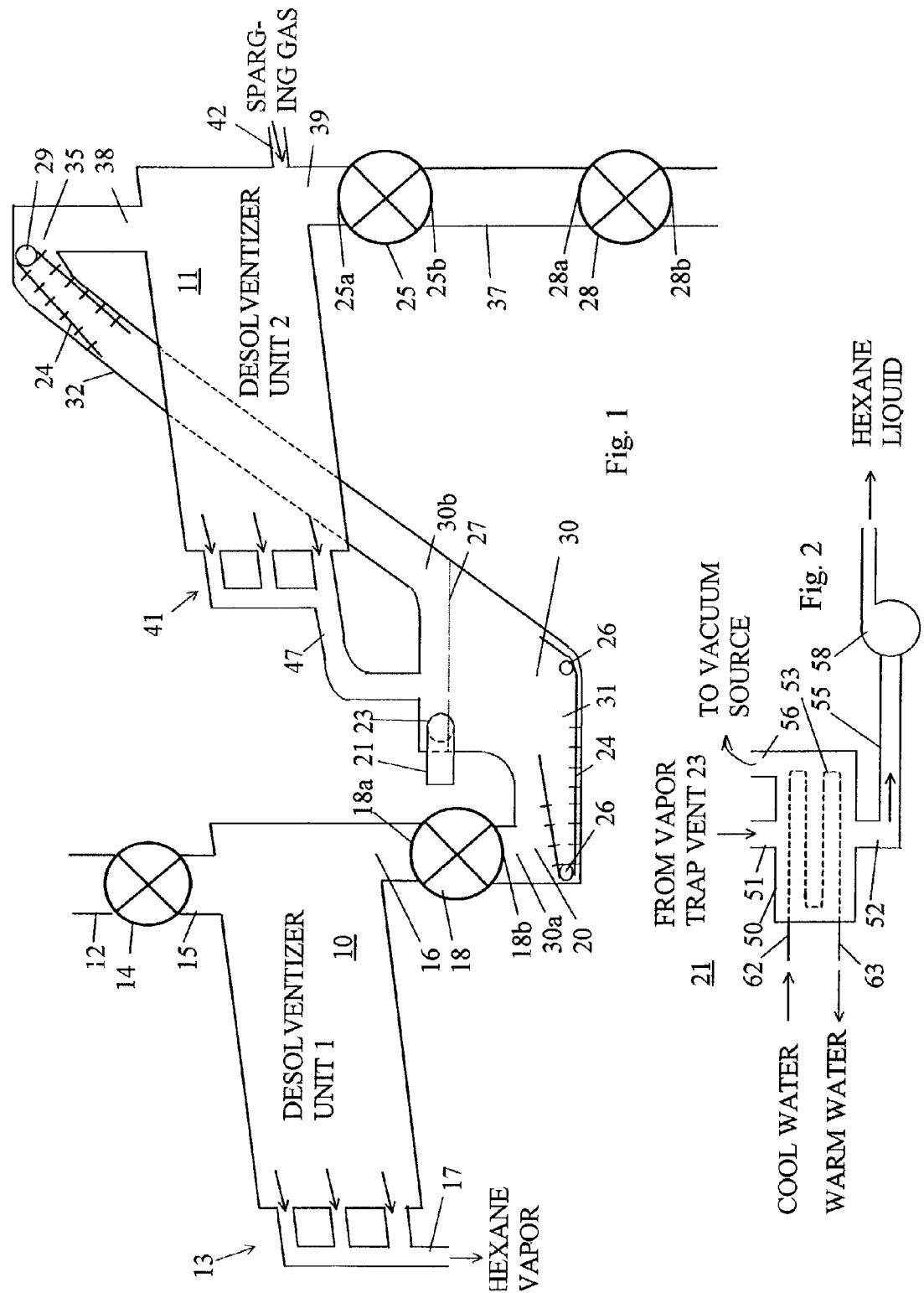

US 6,996,917 B2

TWO STAGE APPARATUS FOR DESOLVENTIZING FOOD GRAIN MEAL

This application claims benefit of U.S. Provisional Application 60/329,790 filed Oct. 15, 2001.

BACKGROUND OF THE INVENTION

Many vegetable grain or seed products such as corn, sunflowers, and soybeans (generally referred to as oilseeds) have a substantial vegetable oil component. Often, this oil is extracted at some point while processing the raw products. The oil itself is a valuable commercial material used in foods, plastics, etc. The solids remaining after extracting the oil are also valuable and can be used for both human and animal foods, as well as for other purposes.

Early steps in processing change the form of the raw oilseed product to flakes or other types of particulate material. This particulate material is still permeated with most of the original natural oil. The oil is then extracted from this particulate material.

A number of different processes for removing or extracting the oil from this particulate material have been developed. The type of oil removal process of interest here is termed solvent extraction. After the grain has been converted to particles, the particles are immersed in a hydrocarbon fluid solvent such as hexane, heptane, isohexane, or any similar petroleum-based solvent that dissolves the oil.

Upon immersing the particles, the solvent forms a liquid solution with the oil in the particles. The oil-solvent solution is then removed from the particles in some manner, usually by simple gravity draining. In gravity draining, a screen supports the particulate material and allows the oil-solvent solution to drain through the screen to a catch basin. The solvent and oil are then separated with a conventional process. Usually, the solvent recovered during this separation step can be used again in the extraction process.

After the oil-solvent solution has drained from the particulate material, there is usually still a significant amount of solvent and a smaller amount of oil permeating the particulate material. Where the particulate material will be used as human food or animal feed, it is important for a number of reasons to remove nearly all of the solvent from the particulate material. First, the solvent may be toxic, so removing the solvent from the particulate material prevents harm to whomever or whatever might consume the end product of the process. Secondly, whether the solvent is toxic or not, it may be an air pollutant so it's important to prevent as much of the solvent as possible from reaching the atmosphere. Third, the solvent is valuable. Extracting it from the particulate material allows its reuse in the oil extraction process.

U.S. Pat. No. 5,630,911 (Kratochwill) discloses apparatus and process for removing a substantial amount of the remaining solvent following gravity draining or other type of oil-solvent removal. The Kratochwill apparatus uses, within an enclosed vessel or volume, a number of inclined conveyors that carry the particulate material over heating plates. The particulate material permeated by the solvent still present is heated to vaporize the solvent. This solvent vapor can then be removed from the enclosed space. Some oil remains in the particulate material, but it forms a small percentage of the total mass. Kratochwill is incorporated by reference into this application.

One feature of the Kratochwill apparatus is that the process occurs at a temperature high enough to reduce the protein dispersability index (PDI) of particulate material having high protein content. A high PDI is preferred for some processed oilseed materials; for these materials, lower process temperature is an advantage.

BRIEF DESCRIPTION OF THE INVENTION

I have developed a desolventizing system capable of removing all but a negligible amount of the solvent from a quantity of solvent-laden vegetable flakes or particles. The system includes a first desolventizer unit having an inlet port for receiving solvent-laden particles, an outlet port for discharging at least partially desolventized particles, and a solvent vapor port. The first desolventizer unit heats the particles to vaporize the liquid solvent. A solvent-steam vapor that is almost all solvent results and can be drawn from the solvent vapor port.

A first airlock has an inlet port in flow connection to the outlet port of the first desolventizer unit, and an outlet port. The first airlock transports the at least partially desolventized particles from the first airlock's inlet port to the first airlock's outlet port while at least partially maintaining any pressure difference existing between the first airlock inlet and outlet ports.

A solvent trap has a chamber from which inlet and outlet ports extend upwardly. The trap's inlet port is connected to receive particles and vapor from the first airlock's outlet port. The trap's outlet port is connected to provide particles to the inlet port of the second desolventizer. The trap has a vapor vent preferably located near the trap's top for connection to a vacuum source.

A second desolventizer unit has an inlet port for receiving particles from the solvent trap chamber, an outlet port for discharging finally desolventized particles, and a solvent vapor port, and also heats the particles. The second desolventizer unit is preferably mounted with the inlet port and the solvent vapor port thereof both at an elevation above the solvent trap's vapor vent to prevent vapor entering the solvent trap from the first airlock, from flowing into the second desolventizer unit.

A second airlock has an inlet port connected to the outlet port of the second desolventizer and receives therefrom the finally desolventized particles. The second airlock has an outlet port through which the finally desolventized particles flow.

A vacuum source attached to the solvent trap vent will create a vacuum within the second desolventizer unit sufficient to lower the boiling point of any liquid solvent or water remaining in the particles to below the temperature that lowers the PDI excessively. In one version, this vacuum is around −7 psig.

BRIEF DESCRIPTION OF THE DRAWINGS

FIG. 1 is a side sketch view of the key elements of the desolventizing system.

FIG. 2 is a block diagram of a preferred condenser/pump unit for forming a vacuum in portions of the desolventizing system.

DESCRIPTION OF THE PREFERRED EMBODIMENTS

FIG. 1 shows one version of the invention intended to remove a very high percentage of solvent permeating a quantity of particulate vegetable material of various shapes (hereafter "flakes" or "flaked material" for convenience). The solvent has been added in earlier steps of processing to extract the oil in the flakes. The invention is particularly suited for removing solvent from flakes comprising a substantial amount of protein and whose temperature should be kept below, say 180° F. to allow the protein to retain its high PDI. Solvents having a boiling point below approximately 180° F. at reduced pressure and that in the gaseous state have a higher mass density than air at similar temperature and pressure are suitable for this application. Hexane, isohexane, and heptane are examples of such solvents.

Structure

The invention uses at least two processing stages, each comprising a desolventizer unit 10 or 11. Each unit 10 or 11 removes a high percentage of solvent present in flaked material entering the particular unit 10 or 11. Each of the desolventizer units 10 and 11 in the preferred embodiment is similar in structure to that disclosed in Kratochwill, although different types of desolventizer units may also be used with little reduction in efficiency. Since the description in Kratochwill is completely adequate to explain the structure and operation of desolventizer units 10 and 11, no detailed discussion of the internal features of units 10 and 11 is deemed necessary. The desolventizer units 10 and 11 each include flake inlet ports 15 or 38 and flake outlet ports 16 or 39. Solvent-laden flakes of an oilseed such as soybeans fall into the inlet port 15 or 38.

Units 10 and 11 each cause the flakes to traverse a circuitous path from flake inlet port 15 or 38 to flake outlet port 16 or 39. Units 10 and 11 apply heat to the flakes during this traversal to vaporize most of the solvent and some of the water in the flakes and form a solvent-steam vapor mixture. Drawing off solvent-steam vapor through solvent vents at 13 and 41 removes a substantial percentage of the solvent literally boiling from the flakes as they pass through the respective unit 10 or 11. At the end of the traversal through each unit 10 or 11, flakes from which has been removed much of the solvent originally present at the input port 15 or 38 of the respective desolventizer unit 10 or 11 fall through outlet ports 16 or 39.

Airlocks or rotary valves 18, 25, and 28 are devices that are intended to support a partial vacuum within desolventizer unit 2 11. One form of the airlocks 18, 25, and 28 has a revolving gate much like a revolving door for transporting flakes under the influence of gravity from inlet ports at 18a, 25a, 28a to the corresponding outlet ports 18b, 25b, 28b. Airlocks using gates or flaps that provide for transport of the flakes from the inlet port to the outlet port while supporting a pressure difference between inlet and outlet ports are also suitable. This structure allows a pressure differential to exist from the airlock inlet ports at 18a, 25a, 28a to the corresponding airlock outlet ports 18b, 25b, 28b.

A solvent trap 30 has an inlet port 30a that receives both solvent-steam vapor and flakes from desolventizer unit 1 10. Most of this solvent-steam vapor leaks through or simply accompanies flakes passing through airlock 18. The solvent-steam vapor is mostly solvent, with a small amount, say 5%, of steam or water vapor. Solvent trap 30 has an outlet port 30b through which flakes pass on the way to desolventizer unit 2 11. A collection chamber 31 at the bottom of solvent trap 30 collects the heavy solvent-steam vapor from desolventizer unit 1 10 where it commingles with the flakes falling from airlock 18. A solvent trap vent 23 near the top of solvent trap 30 is used to create a partial vacuum within solvent trap 30 and to remove solvent vapors from the system.

A flake elevator 32 forms a hermetically sealed conveyor duct from airlock outlet 18b and solvent trap input port 30a through solvent trap 30 and solvent trap outlet port 30b to desolventizer unit 2 inlet port 38. Flakes fall from airlock 18 to the collection chamber 31 at the bottom of solvent trap 30. Elevator 32 carries solvent-bearing flakes falling from airlock outlet port 18b at the elevator inlet 20 through solvent trap 30 to the elevator outlet 35, from which flakes fall into inlet port 38 of desolventizer unit 2 11. Most of the solvent-steam vapor in collection chamber 31 stays in chamber 31 until removed by a condenser/pump unit 21.

Flake elevator 32 may move flakes with a conveyor element comprising a chain 24 (partially shown) having crossbars attached to the chain 24. The chain 24 and crossbars ascend along the bottom interior surface of elevator 32 carrying the flakes upwards and descend along the top interior surface of elevator 32. A drive sprocket 29 (driven by a motor not shown) near the elevator outlet 35 moves the chain 24 within elevator 32. Guide sprockets 26 or channels are located strategically throughout the remainder of elevator 32 to hold the chain in positions that efficiently move flakes from inlet 20 to outlet 35 and prevent descending portions of the chain 24 from catching on ascending portions of chain 24. Alternatively, an auger may be used in place of chain 24 and the crossbars as the conveyor element.

Both inlet port 38 and solvent vents 41 of desolventizer unit 2 11 are preferably located at elevations above the solvent trap vent 23. This limits migration of the heavy solvent-steam vapor from airlock 18 into desolventizer unit 2 11. It's possible however, that by properly arranging the features of solvent trap 30 this elevational relationship may be unnecessary.

A condenser/pump unit 21 shown in more detail in FIG. 2 is attached to vent 23 of solvent trap 30. A housing 50 contains condenser coils 53 receiving cool water from a pipe 62 and discharging warmed water to pipe 63. Liquid pump 58, a steam venturi or other vacuum source connected to vacuum port 56, and condensing coils 53 all cooperate with airlocks 18 and 25 to form a partial vacuum of around −7.0 psig. within housing 50. This vacuum is applied through vent 23 to solvent trap 30, elevator 32, and desolventizer unit 2 11. The vacuum maintained within housing 50 draws the gasses within solvent trap 30 across coils 53 where the solvent vapor condenses into liquid solvent flowing in duct 55. Pump 58 removes the condensed solvent.

Operation

In operation, a continuous volume of solvent-laden flakes from a previous stage of the solvent extraction process passes through an airlock 12 to the inlet 15 of desolventizer unit 10. The mixture at this point in one process of interest may be about 32% solvent by weight, with <1% oil and about 13% water. The large amount of solvent may result from a solvent wash to remove as much oil as possible from the flakes. The flake and solvent temperature may be at around 142° F. The solvent and water is substantially in liquid form and completely permeates the flakes.

Heat is applied to the volume of flakes as they traverse through desolventizer unit 1 10, causing the temperature of the solvent-water mixture permeating the flakes to rise from 142° F. to about 160° F. This causes most of the solvent and some of the water to vaporize forming a solvent-steam vapor that fills the volume of desolventizer unit 1 10. Because the lower boiling point of the solvent, less of the water vaporizes within desolventizer unit 1 10 because the solvent has a lower boiling point than water. This solvent-steam vapor is highly concentrated (about 95%) solvent.

As the solvent converts from liquid to vapor within desolventizer unit 1 10 the solvent-steam vapor is drawn by a low vacuum pump (not shown) through the solvent ports 13 as shown by the arrows. The vapor is collected as highly concentrated solvent-steam vapor mixture at duct 17. The solvent and water can be condensed and separated by equipment not shown and the solvent reused. A lesser amount of the highly concentrated solvent-steam vapor leaks through airlock 18 into solvent trap 30.

At the end of the traverse through desolventizer unit 1 10, the flakes reach the outlet port 16. At this point they have a temperature of about 160° F. and contain a liquid comprising about 0.7% solvent and 11% water because most of the original solvent and some of the water has already been vaporized during the traverse through desolventizer unit 1 10 and removed through ports 13.

From outlet port 16, the flakes fall through the airlock inlet port 18a, the mechanisms of airlock 18, the outlet port 18b of airlock 18, and the inlet port 30a of trap 30 to reach the partial vacuum of solvent trap 30 and the elevator inlet 20. Because of unavoidable leakage of solvent-steam vapor from desolventizer unit 1 10 through airlock 18, some of the highly concentrated solvent-steam vapor mixture reaches trap 30. The relatively high specific gravity of the highly concentrated solvent-steam vapor mixture causes this vapor mixture to collect in the collection chamber 31 of trap 30 to approximately the level shown as dotted interface line 27.

The flakes falling onto elevator chain 24 are transported through the outlet port 30b of solvent trap 30 to elevator outlet 35, from where they fall through inlet port 38 into desolventizer unit 2 11. Upon entering unit desolventizer 2 11, the flakes undergo another stage of desolventizing at the partial vacuum of −7 psig. within unit 2 11. This partial vacuum lowers the boiling point of both the liquid solvent and the water within desolventizer unit 2 11. The solvent and water within desolventizer unit 2 11 thus vaporizes at a lower temperature than when at atmospheric pressure. Accordingly, the temperature within desolventizer unit 2 11 can be kept lower, thereby avoiding reduction of the flake PDI.

During traverse of the flakes through desolventizer unit 2 11, the flake temperature is maintained at about 160° F. At −7 psig., the boiling point of water is around 180° F. and the boiling point of the hexane solvent involved here is around 135° F. At the flake temperature of 160° F., most of the remaining solvent vaporizes, and much of the water evaporates as well. The atmosphere within desolventizer unit 2 11 reaches a state of approximately 30% hexane solvent, 60% steam, and 10% air. I find that a certain amount of air enters through leaks in airlocks 25 and 28.

The solvent-steam vapor forming in desolventizer unit 2 11 is continuously drawn off through solvent vapor ports 41 and supplied to solvent trap 30 through duct 47, although less efficiently, this vapor can also be handled in other ways. The vapor from unit 2 11 has a much lower concentration of solvent than does the vapor from unit 1 10 within trap 30 because of the efficiency of desolventizer unit 1 10. Hence the unit 2 11 vapor has a much lower specific gravity than does the heavier solvent-steam vapor from desolventizer unit 1 10, which tends to collect at the bottom of trap 30. A representative interface line between these two vapor mixtures is shown at 27.

The continuous removal of vapor from trap 30 by condenser/pump unit 21 keeps the vapors in trap 30 from accreting to the point where unit 1 10 vapor can reach unit 2 11 either through elevator 32 or by backflow through duct 47 and vapor ports 41.

One possible advantageous modification to desolventizer unit 2 11 is injecting a sparging gas. A sparging gas inlet port 42 may be connected to a source of sparging gas such as steam (preferably) or nitrogen. A small amount of injected sparging gas may increase the amount of solvent vapor swept from the flakes. The sparging gas along with solvent vapor flows into solvent vapor ports 41, and from there enters solvent trap 30. I prefer to locate the sparging gas inlet port 42 on the side of desolventizer unit 2 11 opposite the side at which solvent vapor ports 41 are located.

At the end of the traverse of flakes through unit 2 11, the flakes fall in order, through airlock 25, vacuum chamber 37 and airlock 28, to a flake-cooling step in the processing. It may be desirable to hold vacuum chamber 37 with a vacuum source not shown, at a vacuum approximating that within desolventizer unit 2 11, thereby reducing the amount of air leakage into desolventizer unit 2 11.

At the flake exit point at the outlet port 28b, the PDI level is still quite high due to the low processing temperature within desolventizer unit 2 11. Due to the efficiency at which desolventizer unit 2 11 operates, the solvent level remaining in the flakes has been reduced to approximately 300 ppm at the airlock outlet 28b.

The condenser/pump unit 21 is shown in greater detail in FIG. 2. Vapors removed from trap vent 23 enter condenser housing 50 through condenser inlet port 51 and flow over cooling coils 53. Cooling water enters coils through port 62 and exits, warmed somewhat, at port 63. The solvent vapor entering at port 51 condenses on coils 53 and drips into outlet port 52.

The condensed solvent and water are drawn from condenser housing 50 through duct 55 by pump 58. Pump 58 returns the low-pressure liquid (mainly solvent) in duct 55 to atmospheric pressure. This liquid is now more or less at room temperature. Water vapor and air along with trace amounts of solvent vapor within housing 50 are drawn through port 56 by the vacuum source. If desired, further processing can remove more of the water from the condensed solvent in duct 55. At any rate, the solvent condensate can be reused in the process, thereby at least partially avoiding the need to dispose of the used solvent and improving the environmental friendliness of the process. Similarly, the vapor exiting vacuum port 56 can either be subjected to further processing to remove any solvent still present, or if the solvent level is negligible, can be discharged safely and legally to the atmosphere.

In one version of this process, the vacuum source comprises a steam venturi unit operating according to well-known principles. Such a vacuum source is advantageous because no moving parts are required to generate the vacuum, adding reliability to the process. A mechanical pump or fan may also be used as the vacuum source.

What is claimed is:

1. A desolventizing system for removing solvent from a quantity of solvent-laden particles comprising:
   a) a first desolventizer unit having an inlet port for receiving solvent-laden particles, an outlet port for discharging at least partially desolventized particles, and a solvent vapor port discharging solvent vapor;
   b) a first airlock having an inlet port in flow connection to the outlet port of the first desolventizer unit, and an outlet port, said first airlock transporting the at least partially desolventized particles from the first airlock's inlet port to the first airlock's outlet port while at least partially maintaining any pressure difference existing between the first airlock inlet and outlet ports;
   c) a solvent trap having a chamber from which inlet and outlet ports extend upwardly, said trap's inlet port connected to receive particles and vapor from the first airlock's outlet port, and said trap having a vent for connection to a vacuum source;

d) a second desolventizer unit having an inlet port for receiving particles from the solvent trap's outlet port, an outlet port for discharging finally desolventized particles, and a solvent vapor port discharging solvent vapor; and e) a second airlock having an inlet port connected to the outlet port of the second desolventizer and receiving therefrom the finally desolventized particles, and whose outlet port discharges the finally desolventized particles, while at least partially maintaining any pressure difference existing between the second airlock inlet and outlet ports.

2. The desolventizing system of claim 1, wherein said second desolventizer unit is mounted with the inlet port thereof at an elevation above the solvent trap's vent.

3. The desolventizing system of claim 2, including a duct connecting the second desolventizer unit's vapor port to the solvent trap.

4. The desolventizing system of claim 3, wherein the second desolventizer unit's vapor port is located at an elevation above the solvent trap vent.

5. The desolventizing system of claim 2, wherein a particle elevator comprising a sealed conveyor duct for conveying particles from the outlet port of the first airlock to the inlet of the second desolventizer unit, the sealed conveyor duct including an internal mechanical conveyor element for carrying particles from the solvent trap chamber to the second desolventizer unit inlet port.

6. The desolventizing system of claim 5, wherein the particle elevator slopes generally upwards from the solvent trap to the inlet of the second desolventizer unit.

7. The desolventizing system of claim 6, wherein the solvent trap vent is located near the top of the solvent trap.

8. The desolventizing system of claim 1, wherein the solvent trap vent is located near the top of the solvent trap.

9. The desolventizing system of claim 1, including a third airlock in series with the second airlock.

10. The desolventizing system of claim 1, wherein the second desolventizer unit includes an inlet port for connection to a source of sparging gas.

11. The desolventizing system of claim 10, wherein the solvent vapor port is located on a side of the second desolventizer unit and the sparging gas inlet port is located on the side of the second desolventizer unit opposite the side at which the solvent vapor port is located.

* * * * *